United States Patent [19]
Abe et al.

[11] Patent Number: 5,214,490
[45] Date of Patent: May 25, 1993

[54] SHEET DIMENSION MEASUREMENT SYSTEM

[75] Inventors: Norihiro Abe; Tatsuyuki Miyagawa, both of Yokohama, Japan

[73] Assignee: Reliance Electric Ltd., Kanagawa, Japan

[21] Appl. No.: 777,343

[22] PCT Filed: Apr. 25, 1991

[86] PCT No.: PCT/JP91/00558
§ 371 Date: Dec. 5, 1991
§ 102(e) Date: Dec. 5, 1991

[87] PCT Pub. No.: WO91/16599
PCT Pub. Date: Oct. 31, 1991

[30] Foreign Application Priority Data
Apr. 26, 1990 [JP] Japan .................................. 2-111096

[51] Int. Cl.5 .............................................. G01B 11/02
[52] U.S. Cl. ...................................... 356/383; 250/560; 356/385; 358/107
[58] Field of Search ............... 356/372, 383, 384, 385, 356/386, 387; 280/559, 560, 561, 571; 358/107

[56] References Cited

U.S. PATENT DOCUMENTS 4,301,373 11/1981 Sjödin .............................. 250/560

FOREIGN PATENT DOCUMENTS 54-153060 12/1979 Japan .
62-229011 10/1987 Japan .
62-229012 10/1987 Japan .
63-29206 2/1988 Japan .
63-81203 4/1988 Japan .

*Primary Examiner*—F. L. Evans
*Attorney, Agent, or Firm*—McGlew and Tuttle

[57] ABSTRACT

With four CCD (charge coupled device) based cameras and flashing devices, each of which is installed with an angle against the optical axis of a camera, four corners of sheets being transferred line are photographed. Each of four corner detecting sections detects absolute coordinates of a corner based on differences in brightness of standstill picture of sheet corner taken by each camera. Then, based on the detected absolute coordinates of sheet corners, sheet dimensions computing section calculates lengths, widths and diagonal dimensions of sheets.

2 Claims, 11 Drawing Sheets

SHEET DIMENSION MEASUREMENT SYSTEM

DESCRIPTION

1. Technical Field

This invention relates to a system for measuring dimensions of sheets moving on a transferring line and also relates to a sheet dimension measurement system enabling the inspection of dimensions and shapes of sheets.

2. Background Technologies

At production lines that cut off belt-form paper, corrugated, aluminum sheets, copper sheets, steel sheets and the like to produce rectangular sheets, it is conventionally carried out by hands to inspect whether or not dimensions and shapes of cut sheets are within their standards.

For example, persons measure, by their hands, dimensions of several sheets after cutting off, or inspect irregularity of cutting surfaces of sheets, during cutting process or after cutting, by touching cutting surfaces by hands or visually, using a sheet being within standard as standard, in order to inspect cutting accuracies.

When accurate cutting dimensions are required, persons measure lengths, widths, and diagonal dimensions of every sheet with measure.

Because the aforementioned conventional method relies on man-power, it has such disadvantages that inspections take longer time and furthermore involve dangers.

DISCLOSURE OF THE INVENTION

It is an object of this invention to provide a sheet dimension measurement system to measure dimensions of all sheets being transferred on a transferring line.

It is another object of this invention to provide a sheet dimension measurement system enabling the performance not only of measurement of sheet dimensions but also inspection of sheet shapes.

The sheet dimension measurement system of the first invention comprises:

a plurality of cameras installed above a transferring line transferring sheets, so as to keep one of four sheet corners within a field of view of a corresponding one of the cameras with each corner being kept within a field of view of a corresponding one of the cameras and to be movable in accordance with sheet dimensions.

a plurality of flashing devices, each installed with an angle against an optical axis of each of the cameras, so as to produce shadows of four sheet corners for the cameras and to be movable interlocking with the cameras.

a plurality of corner detecting sections for detecting absolute coordinates of sheet corners based on differences in brightness of standstill pictures taken by the cameras, and a sheet dimension computing section for calculating lengths, widths and diagonal dimensions of sheets based on the detected absolute coordinates of four sheet corners.

The sheet dimension measurement system of the second invention comprises: A sheet dimension measurement system, comprising:

a plurality of first cameras installed above a transferring line transferring sheets, so as to keep one of four sheet corners within a field of veiw of a corresponding one of the first cameras with each corner being kept within a field of view of a corresponding one of the cameras and to be movable in accordance with sheet dimensions.

a plurality of second cameras installed so as to keep one of four sheet sides within a field of view of a corresponding one of the second cameras with each side being kept within a field of view of a corresponding one of the cameras and to be movable in accordance with sheet dimensions, a plurality of first flashing devices, each installed with an angle against an optical axis of each of the second cameras, so as to produce shadows of four sheet corners for the first cameras and to be movable interlocking with the first cameras, a plurality of second flashing devices, each installed with an angle against an optical axis of each of the second cameras, so as to produce shadows of four sheet sides for the second cameras and to be movable interlocking with the second cameras, a plurality of corner detecting sections for detecting absolute coordinates of four sheet corners based on differences in brightness of standstill pictures of four sheet corners taken by the first cameras, a plurality of side detecting sections for detecting absolute coordinates of centers of four sheet sides based on differences in brightness of standstill pictures of four sheet sides taken by the second cameras, a sheet dimension computing section for calculating lengths, widths and diagonal dimensions of sheets based on the detected absolute coordinates of sheets corners, and a sheet shape inspecting section for inspecting sheet shapes based on the detected absolute coordinates of sheet corners and sheet side centers.

BRIEF DESCRIPTION OF DRAWINS

BEST MODE FOR EXECUTING THE INVENTION

Figure 1A:
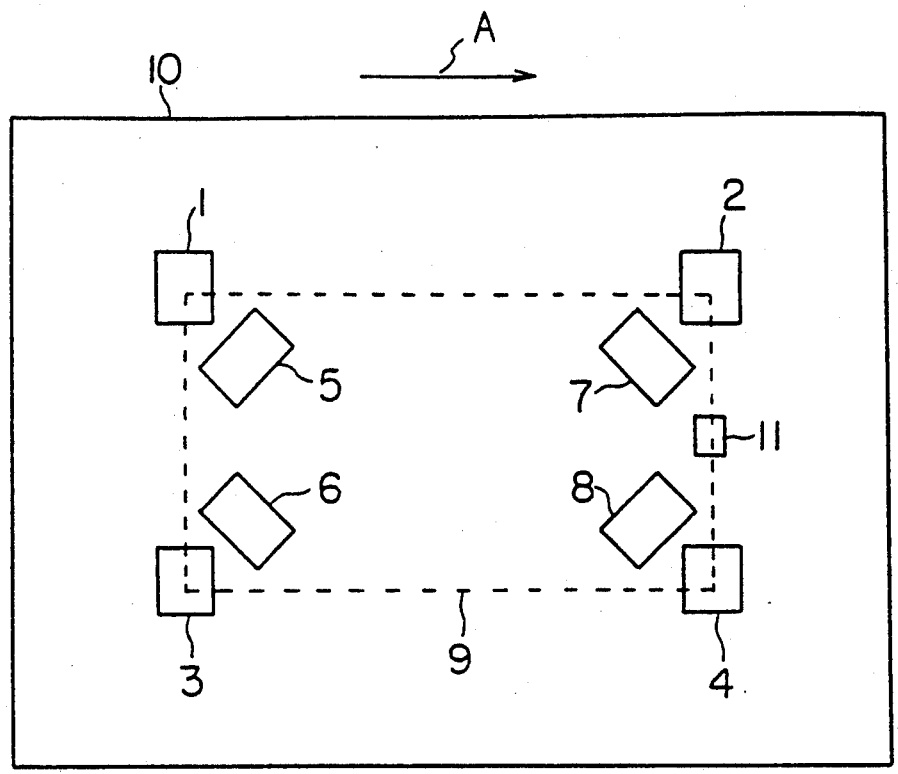
FIGS. 1A and 1B are plan and side view of the sheet dimension measurement system of the first invention.
Figure 1B:
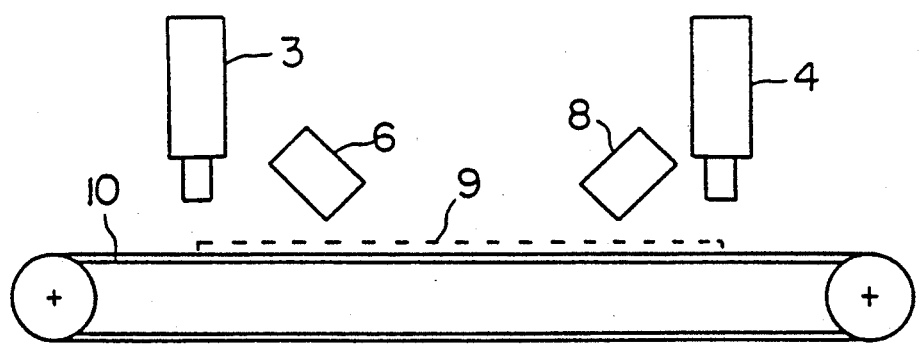

FIGS. 1A and 1B are plan and side view showing the arrangement of CCD based cameras and flashing devices of an embodiment where the sheet dimension measurement system of the first invention is put into practice.

Above a transferring line 10 transferring sheet 9, like a conveyor system, CCD based cameras 1, 2, 3 and 4 are installed at positions enabling them to take standstill pictures of four corners of a sheet 9 being transferred in the direction of an arrow A. Adjacently to each of the cameras, each of flashing devices 5, 6, 7 and 8 is installed, with an angle, for example, with an angle of 45°, against the optical axis of each camera, so that shadows of sheet corners are produced when flash light is emitted. These shadows are essential for detection of sheet corners as described below. Furthermore, a sensor 11 is provided above the transferring line 10, to detect the front edge of sheet 9.

The cameras and flashing devices are automatically movable to appropriate positions in accordance with sheet dimensions to be measured. Such mechanism can be realized easily with currently available usual technologies.

Figure 2:
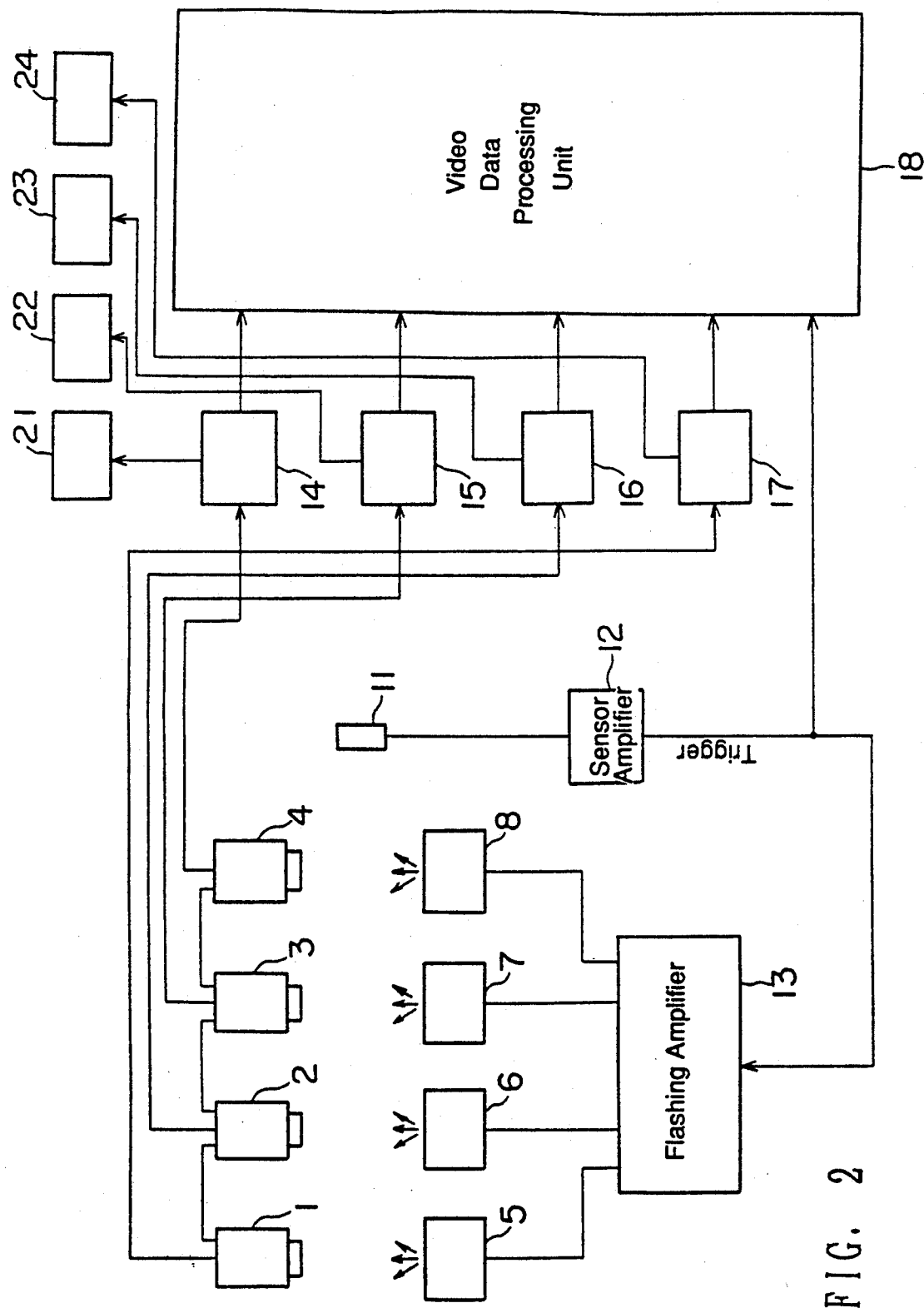
FIG. 2 shows the overall system construction of the embodiment shown in FIG. 1.

FIG. 2 is a drawing showing the overall system configuration of this embodiment.

The sheet dimension measurement system of this embodiment consists of the aforementioned CCD based cameras 1, 2, 3 and 4, flashing devices 5, 6, 7 and 8, and sheet front edge detecting sensor 11 as well as sensor amplifier 12, flashing device amplifier 13, frame memories 14, 15, 16 and 17, video data processing unit 18, and monitors 21, 22, 23 and 24.

Figure 3:
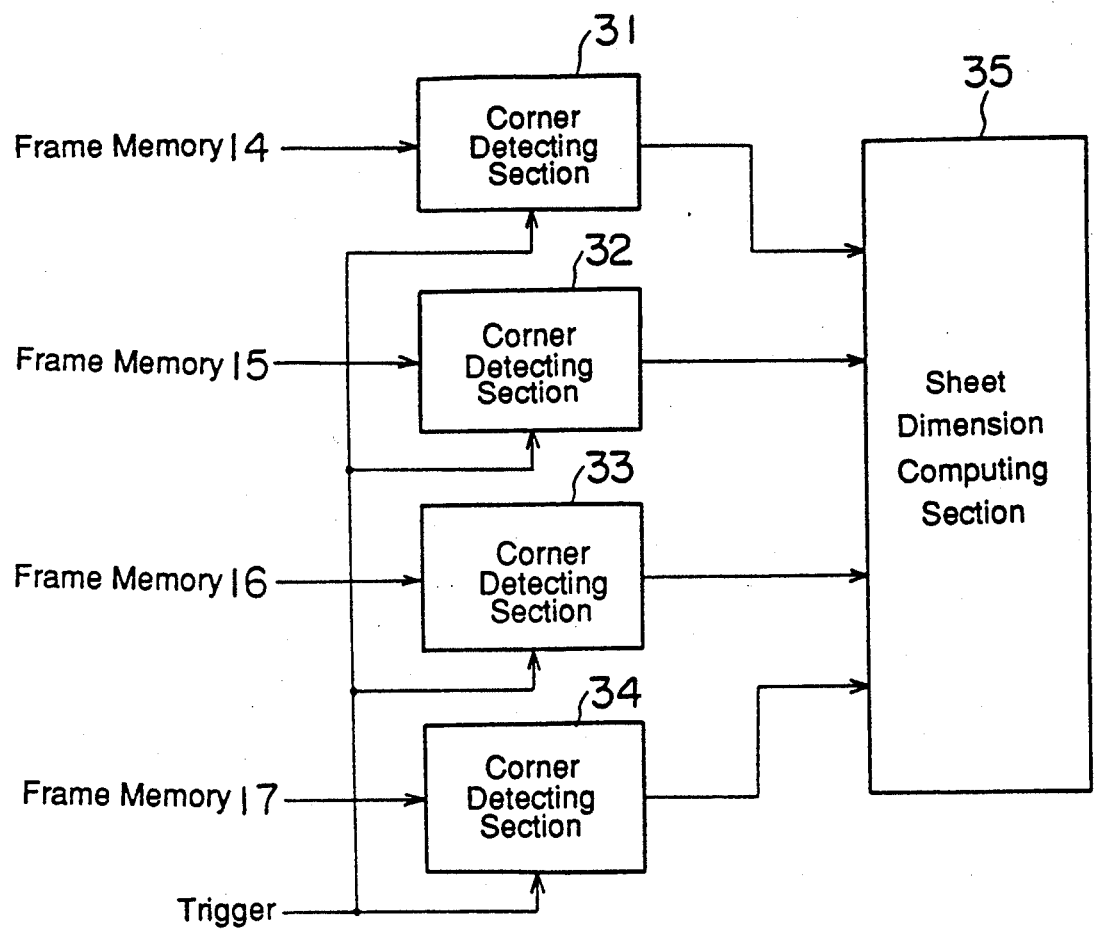
FIG. 3 is a functional block diagram of video data processing unit.

FIG. 3 is a block diagram showing the functions of video data processing unit 18. The video data processing unit consists of corner detecting sections 31, 32, 33 and 34 to detect absolute coordinates of sheet corners based on light-and-shade pictures sent from the frame memories, and sheet dimension section 35 to calculate sheet dimensions based on absolute coordinate sent from these detecting sections.

The functions of this embodiment are explained below.

When the sensor 11 detects the front page of sheet 9 being transferred on the transferring line, a trigger input is sent from the sensor amplifier 12 to the flashing amplifier 13, and the flashing devices 5 to 8 emit light. At the same time that standstill pictures of four sheet corners are taken by the cameras 1 to 4, the standstill pictures are sent to the frame memories 14 to 17.

Then, the corner detecting sections 31, 32, 33 and 34 in the video data processing unit 18 analyze absolute coordinates of sheet corners on the field of view of the cameras, from the light-and-shade pictures of 256 tone levels stored in the frame memories. The algorithm for this analysis is explained below.

Figure 4A:
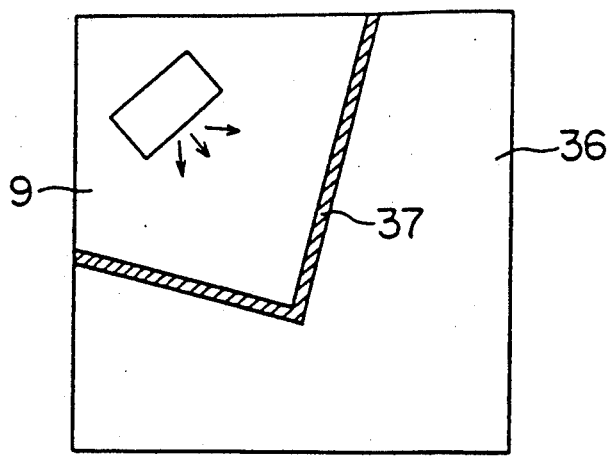
FIGS. 4A, 4B and 4C are drawings illustrating the algorithm to obtain absolute coordinates of sheet corners.

Basically, the detection of sheet corners is carried out by utilizing shadow 37 of sheet 9 produced by flash light within the field of view of the camera 36, as shown in FIG. 4A. In the light-and-shade pictures of 256 tone levels stored in the frame memories, the darkest portions are the shadows of sheet corners, and the sheet corners are detected based on these shadows. This method is explained below, referring to FIGS. 4B and 4C.

For a field view of a camera, the origin of coordinate (0,0), X-axis and Y-axis are defined as shown in the figures.

(1) The position of sheet side $x_1$ on X-axis and the position of sheet side $y_1$ on Y-axis are obtained.

Figure 4B:
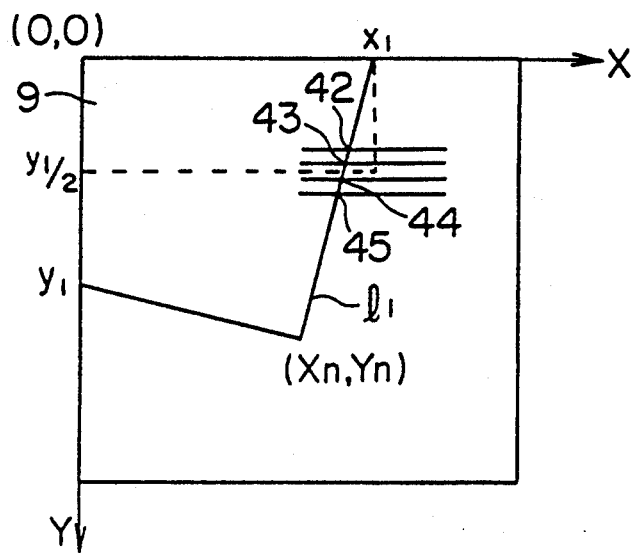

(2) As shown in FIG. 4B, n number of straight lines (for example, n=4) are drawn in parallel with X-axis, between $-a$ and $+a$ picture elements in the direction of X-axis (for example, a=30 elements) and with an interval of b picture elements in the direction of Y-axis (for example, b=2 elements), making the point $$\left(x_1, \frac{y_1}{2}\right)$$

center. Then the X-axis positions of the intersections between these straight lines and a sheet side are defined as $x_2$, $x_3$, $x_4$ and $x_5$ respectively, and the average value $x_6$ is obtained as follows.

$$x_6 = \frac{x_2 + x_3 + x_4 + x_5}{4}$$

(3) Then, a straight line $l_1$ connecting between point $(x_1, 0)$ and point $$\left(x_6, \frac{y_1}{2}\right)$$

is obtained.

Figure 4C:
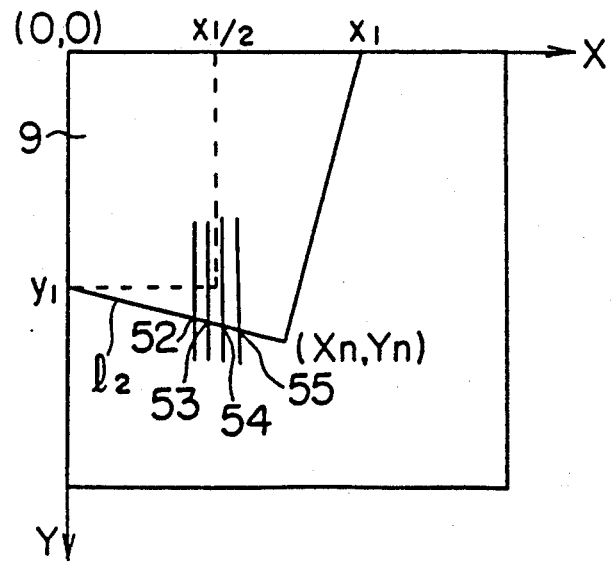

(4) As shown in FIG. 4C, n number of straight lines (for example, n=4) are drawn in parallel with Y-axis, between $-a$ and $+a$ picture elements in the direction of Y-axis (for example, a=30 elements) and with an interval of b of picture elements in the direction of X-axis (for example, b=2 elements), making the point $$\left(\frac{x_1}{2}, y_1\right)$$

center. Then, the Y-axis positions of the intersections between these straight lines and a sheet side are defined as $y_2$, $y_3$, $y_4$ and $y_5$ respectively, and the average value $y_6$ is obtained as follows.

$$y_6 = \frac{y_2 + y_3 + y_4 + y_5}{4}$$

(5) Then, a straight line $l_2$ connecting between point $(0, y_1)$ and point $$\left(\frac{x_1}{2}, y_6\right)$$

is obtained.

(6) The intersection of the straight line $l_1$ and $l_2$ is obtained, and becomes absolute coordinates of a sheet corner.

From the aforementioned pressing procedures (1) to (6), coordinates of a corner of sheet 9 $(x_n, y_n)$ can be obtained. In the above procedures, the reason why the average values of positions of intersections between n number of straight lines and sheet sides are obtained, is to eliminate error to be caused by dust attached to sheet sides and/or by irregularity of sheet sides. When obtaining such average values, the number of straight lines n, the length of straight lines 2a (picture elements), and the interval of straight lines b (picture elements) are determined based on the kind of sheet, required measurement accuracy, and the like.

The standstill pictures taken by each camera can be monitored by each of the monitors 21 to 24.

With the aforementioned procedures, the points $x_1$ to $x_5$ and $y_1$ to $y_5$ can be obtained. The algorithm to obtain these points is explained below, referring to FIG. 5, which shows brightness distribution of one feed in the direction of X-axis or Y-axis, provided that sheet is brighter than conveyor belt of the transferring line.

(1) In the brightness distribution of one feed, a point to start search of sheet sides and a point to one search of sheet sides are designated. The way of designation is as follows. When the point $x_1$ in FIG. 4B is to be obtained, all the picture elements of one feed must be designated, and when the points $x_2$, $x_3$, $x_4$ and $x_5$ in FIG. 4B are to be obtained, the range to be designated is from the picture elements of $(x_1-30)$ to $(x_1+30)$. When the point $y_1$ in FIG. 4C is to be obtained, all the picture elements of one feed must be designated, and when the points $y_2$, $y_3$, $y_4$ and $y_5$ in FIG. 4C are to be obtained, the range to be designated is from the picture elements of $(y_1-30)$ to $(y_1+30)$.

Figure 6:
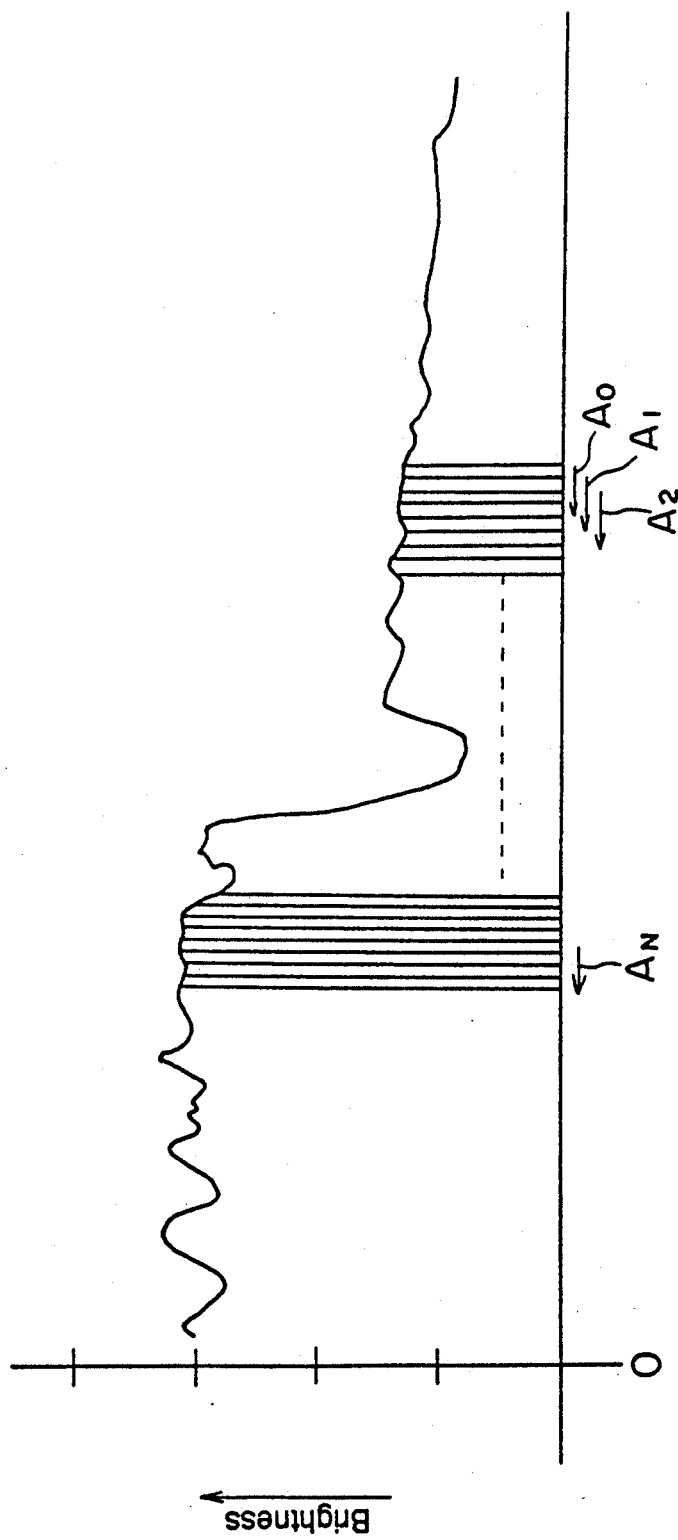

(2) As shown in FIG. 6, brightness of each picture element is obtained in the direction of sheet from the starting point in the designated range, and a sum of brightness for c number of picture elements (for example, c=5) is obtained. Repeating such a procedure for the whole designated range, the obtained sums are defined as $A_0, A_1, A_2, \ldots A_N$, and the minimum value in these sums is defined as $A_{MIN}$.

Figure 5:
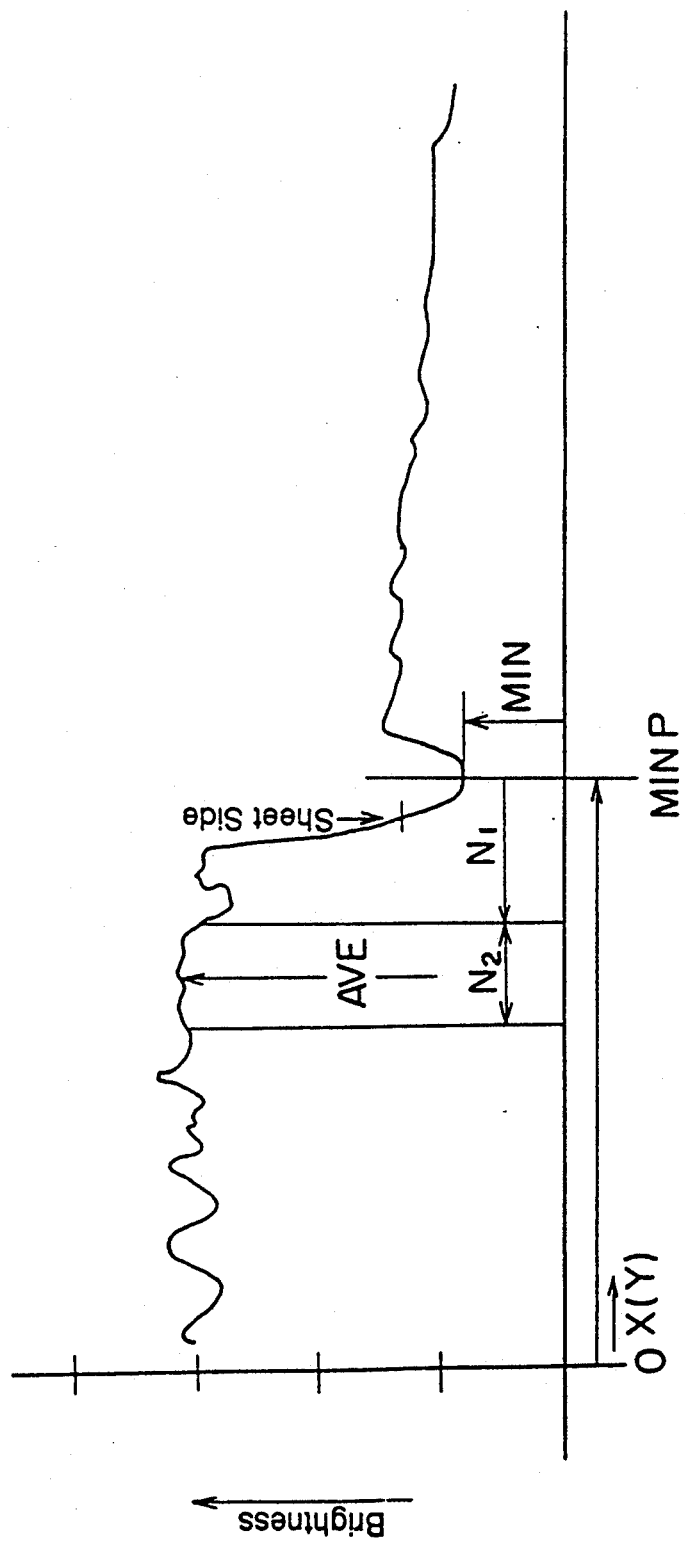
FIGS. 5 and 6 are drawings illustrating the algorithm to obtain positions of sheet sides.

(3) Then, the position of picture element MINP to give the minimum brightness MIN in the c number of picture elements producing the minimum sum $A_{MIN}$ is obtained. As shown in FIG. 5, the shadow of sheet gives the minimum sum $A_{MIN}$, and therefore, the picture element to give the minimum brightness MIN is located in the shadow.

(4) In FIG. 5, an average of brightness AVE of $N_2$ number of picture elements from the position shifting by $N_1$ number of picture elements from the position MINP is obtained. This average AVE shows the brightness of sheet. The values of $N_1$ and $N_2$ must be determined to enable obtaining the brightness of the sheet.

(5) Brightness of each picture element is obtained starting from the position MINP in the direction of sheet, and the position of picture element having the brightness to be obtained by the following equation is defined as sheet side.

$$\text{MIN}+(\text{AVE}-\text{MIN})\times\alpha \quad 0<\alpha\leq 1.$$

$\alpha$ is a parameter to be determined by kind of material and thickness of sheet and the like. It is also possible to use the brightness of the conveyor belt of transferring line as AVE.

The aforementioned algorithm to obtain absolute coordinates of sheet corners is implemented in each of the corner detecting section 31, 32, 33 and 34 in FIG. 3, and the obtained absolute coordinates of corners are sent to the sheet dimension computing section 35. Before starting the above procedures, a trigger input is sent from the sensor amplifier 12 to each corner detecting section as process start command.

Figure 7:
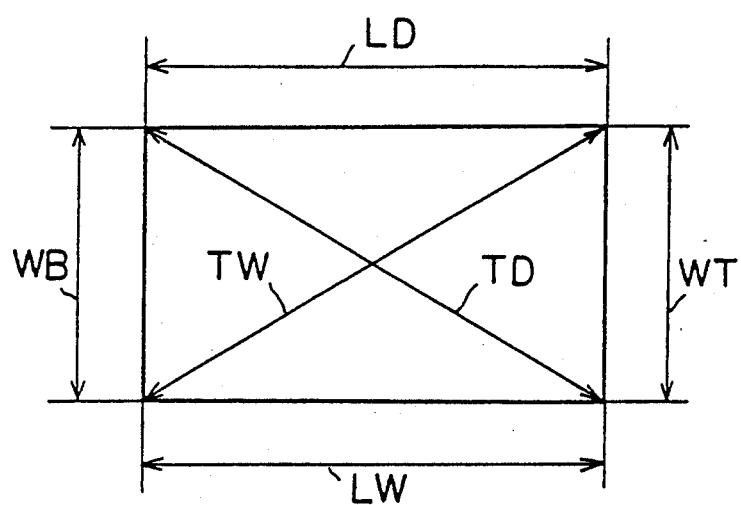
FIG. 7 is a drawing showing sheet dimensions to be measured.

In the sheet dimension computing section 25, the sheet dimensions shown in FIG. 7, namely the lengths LD and LW, the widths WT and WB, and the diagonal dimensions TD and TW, are calculated. To perform this calculation, the absolute coordinates of the lens center of each camera must be measured in advance and must be input to the sheet dimension computing section as parameters.

The calculated sheet dimensions are sent to appropriate display media and are displayed. It is also possible to compare the obtained sheet dimensions with standard dimensions and to notify incorrect sheet dimensions, for example, by raising alarm, when any deviations from the standard values are found.

An embodiment of the second invention is explained below.

Figure 8:
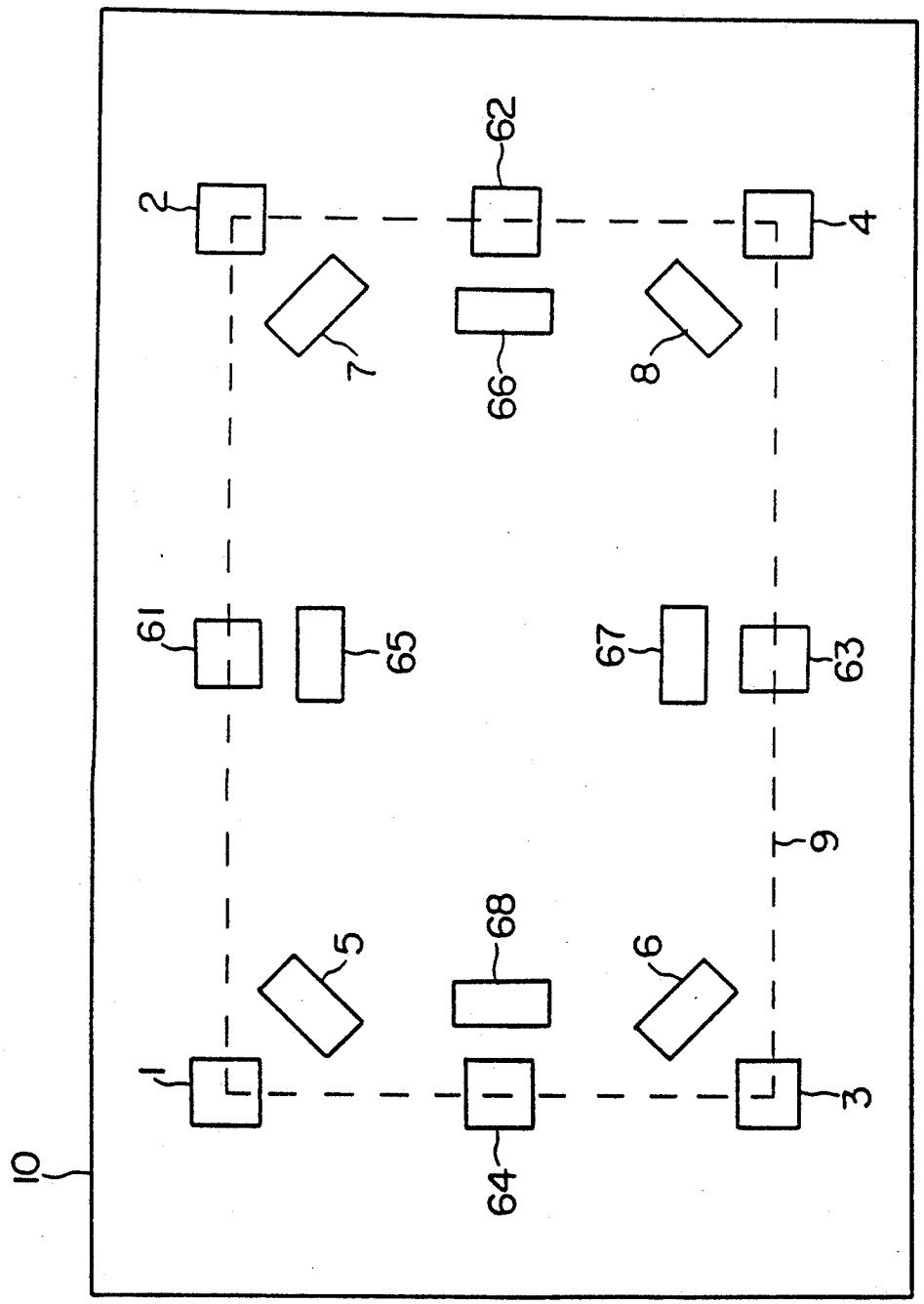
FIG. 8 is a plan view of a practice example of the second invention.

FIG. 8 is a plan view to show arrangement of CCD based cameras and flashing devices of a sheet dimension measurement systems of the embodiment. This sheet dimension measurement system is equipped with CCD based cameras 61, 62, 63 and 64 to take standstill pictures of sheet sides, in addition to the four CCD based cameras 1, 2, 3 and 4 shown in FIG. 1, and with flashing devices 65, 66, 67 and 68 to give flash light enabling to produce shadows of sheet sides.

The camera 61 is arranged so that its lens center is located at the center of straight line connecting between the cameras 1 and 2, the camera 62 is arranged so that its lens center is located at the center of straight line connecting between the cameras 2 and 4, the camera 63 is arranged so that its lens center is located at the center of straight line connecting between the cameras 3 and 4, and the camera 64 is arranged so that its lens center is located at the center of straight line connecting the cameras 1 and 3.

Figure 9:
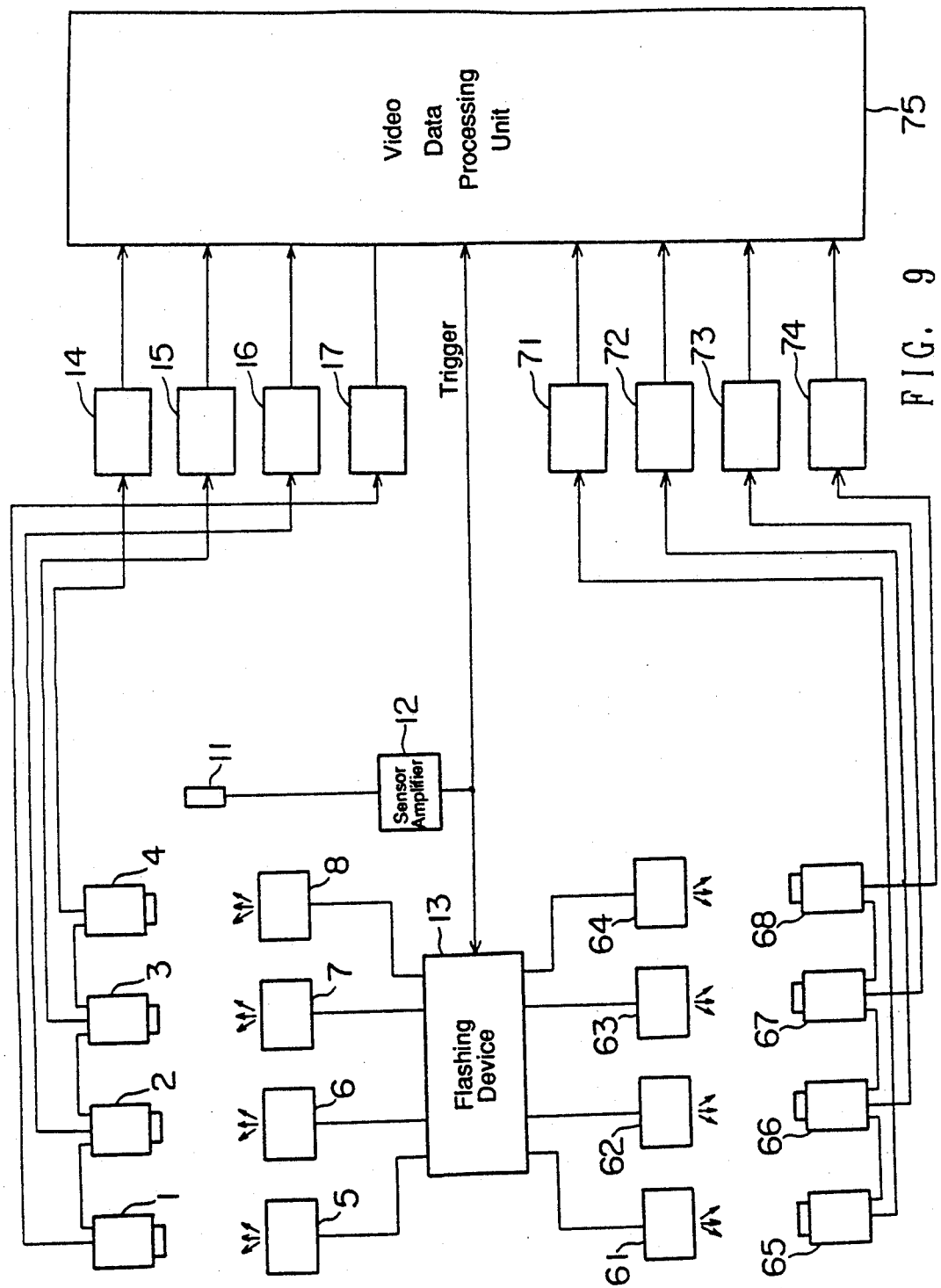
FIG. 9 shows the system construction of the embodiment shown in FIG. 8.

FIG. 9 shows the overall system configuration of this sheet dimension measurement system. To the system configuration shown in FIG. 2, frame memories 71, 72, 73 and 74 are added. Actually, a monitor is connected to each of the frame memories 14 to 17 and 71 to 74, though such monitors are omitted from FIG. 9.

Figure 10:
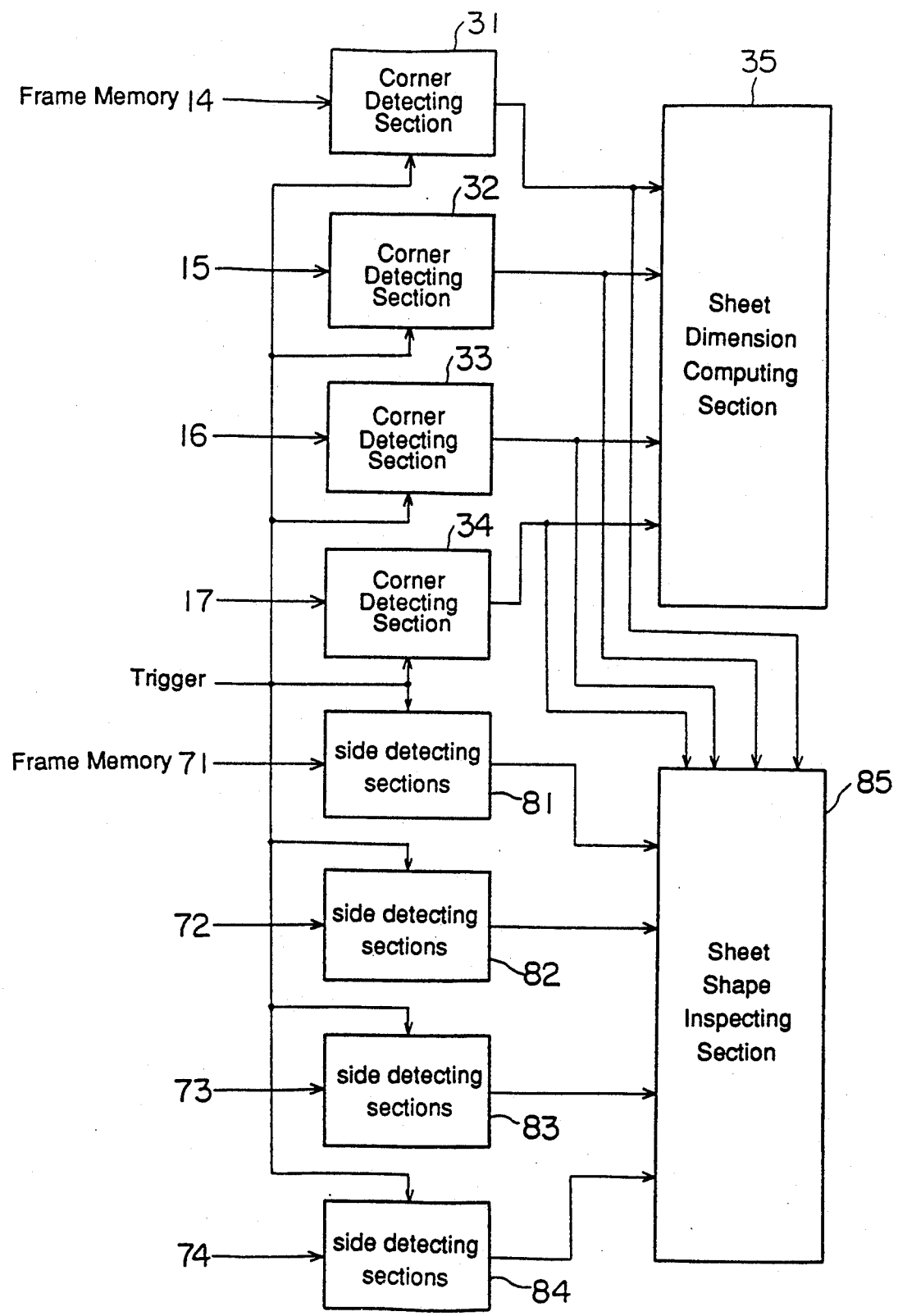
FIG. 10 is a block diagram of video data processing unit.

FIG. 10 shows a functional block diagram of video data processing unit 75. In addition to the construction shown in FIG. 3, the video data processing unit has side detecting sections 81, 82, 83 and 84 to detect center positions of sheet sides based on standstill pictures sent from the frame memories 71, 72, 73 and 74, and a sheet shape inspecting section 85. To this sheet shape inspecting section 85, coordinates data are sent from corner detecting sections 31 to 34 and side detecting sections 81 to 84 as inputs. Because the functions of the corner detecting sections 31 to 34 and the sheet dimension computing section 35 are as described above, they are omitted from the following explanation.

Figure 11:
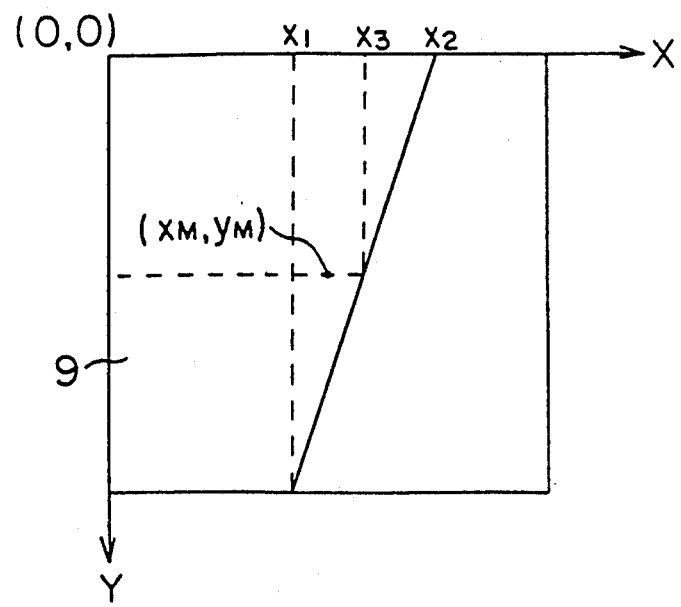
FIG. 11 is a drawing illustrating the algorithm to obtain absolute coordinates of sheet side centers.

The functional algorithm of the side detecting sections is explained below, referring to FIG. 11. Same as FIG. 4, FIG. 11 shows a field of view of a camera, which takes picture of sheet 9.

(1) X-axis positions of intersections $x_1$ and $x_2$ between the field line of view of a camera and a sheet side are obtained.

(2) Defining the center coordinates of the field of view of a camera as $(x_M, y_M)$. X-axis positions $x_3$ of intersection between a sheet side and a straight line passing through the point $(x_M, y_M)$ in parallel with X-axis (X-axis position of center) can be obtained, by calculation of $(x_1+x_2)/2$. The value of $x_3$ is sent to the sheet shape inspecting section 85.

Figure 12:
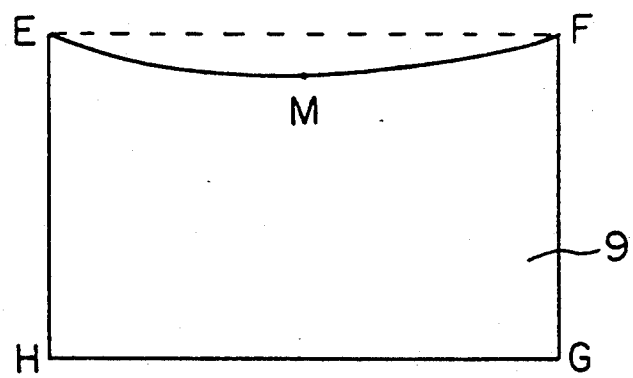
FIG. 12 is a drawing illustrating transformation of sheet sides.

To the sheet shape inspecting section 85, the absolute coordinates of lens centers of cameras are sent in advance, and then, the coordinates of corners are sent from the corner detecting sections 31 to 34, and the coordinates of side centers are sent from the side detecting sections 81 to 84. Therefore, when the corners of sheet 9 are defined as E, F, G and H as shown in FIG. 12, it is possible to calculate, for example, a distance of center M from a straight line connecting between E and F. If such a distance is larger than standard value, it is notified that the sheet shape is incorrect. Though FIG.

12 explains the side EF only, the remaining sides can be inspected in the same way.

INDUSTRIAL APPLICABILITY

With this invention, dimensions of rectangular sheets being transferred on a transferring line can be automatically detected without hands. It is also possible to inspect whether or not the measured dimensions are within standards. It is furthermore possible to inspect shapes of sheets, particularly shapes of sheet sides.

While specific embodiments of the invention have been shown and described in detail to illustrate the application of the principles of the invention, it will be understood that the invention may be embodied otherwise without departing from such principles.

We claim:

1. A sheet dimension measurement system, comprising:
   a plurality of cameras installed above a transferring line transferring sheets, including a camera positioned above each of four sheet corners wherein said camera maintains a corresponding sheet corner within its field of view, each of said cameras being moveable in accordance with sheet dimensions;
   a plurality of flashing devices, each flashing device being installed at an angle with respect to an optical axis of a corresponding one of said cameras for producing shadows of a corresponding sheet corner, each of said flashing devices, being fixed with respect to said camera and moveable therewith;
   corner detecting means including a plurality of corner detecting sections for detecting absolute coordinates of sheet corners based on differences in brightness of standstill pictures taken by said cameras; and
   sheet dimension computing means including a sheet dimension computing section for calculating lengths, widths and diagonal dimensions of sheets based on said detected absolute coordinates of said sheet corners.

2. A sheet dimension measurement system, comprising:
   a plurality of first cameras installed above a transferring line transferring sheets, including a first camera positioned above each of four sheet corners to maintain a corresponding sheet corner within a field of view of said first camera, each of said first cameras being movable in accordance with sheet dimensions;
   a plurality of second cameras including a second camera installed above each of four sheet sides to maintain a portion of each sheet side within a field of view of said second camera, said second cameras being moveable in accordance with sheet dimensions;
   a plurality of first flashing devices, each of said first flashing devices being installed at an angle with respect to an optical axis of a corresponding one of said first cameras for producing shadows of a corresponding sheet corner for viewing by said corresponding one of said first cameras, each of said first flashing devices being fixed with respect to a corresponding one of said first cameras and movable therewith;
   a plurality of second flashing devices, each of said second flashing devices being installed an at angle with respect to an optical axis of a corresponding one of said second cameras for producing shadows of a corresponding sheet side for said corresponding one of said second cameras, each of said flashing devices being fixed with respect to a corresponding one of said second cameras and being moveable therewith;
   corner detecting means including a plurality of corner detecting sections for detecting absolute coordinates for four sheet corners based on differences in brightness of standstill pictures of four sheet corners taken by said first cameras;
   side detection means including a plurality of side detecting sections for detecting absolute coordinates of centers of four sheet sides based on differences in brightness of standstill pictures of four sheet sides taken by said second cameras;
   sheet dimension computing means including a sheet dimension computing section for calculating length, widths and diagonal dimensions of sheets based on the detected absolute coordinates of sheet corners; and
   sheet shape inspection means including a sheet shape inspecting section for inspecting sheet shapes based on the detected absolute coordinates of sheet corners and sheet side centers.

* * * * *